Patented Sept. 27, 1932

1,879,425

UNITED STATES PATENT OFFICE

WILHELM NEELMEIER AND OTTO GOLL, OF LEVERKUSEN-I. G. WERK, GERMANY, ASSIGNORS TO GENERAL ANILINE WORKS, INC., OF NEW YORK, N. Y., A CORPORATION OF DELAWARE

HYDROXYCARBAZOLE-SULPHONIC ACID

No Drawing. Application filed November 24, 1931, Serial No. 577,154, and in Germany December 4, 1930.

The present invention relates to a new hydroxycarbazole-sulphonic acid, more particularly it relates to the 2-hydroxycarbazole-7-sulphonic acid of the formula:

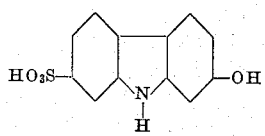

According to our invention this hitherto unknown hydroxycarbazole-sulphonic acid is obtained in form of its alkali metal salts by heating carbazole-2.7-disulphonic acid with a caustic alkali at a temperature between about 260–280° C. By employing superatmospheric pressure, the process can likewise be carried out in the presence of water, i. e. in aqueous caustic alkaline solution.

From the alkali metal salts of the 2-hydroxycarbazole-7-sulphonic acid the free acid can be prepared in the usual manner, for example, by dissolving the alkali metal salts in water, transforming the alkali metal salts into the barium salt by the addition of barium chloride, filtering the barium salt which is difficultly soluble in water and which has precipitated, dissolving the barium salt in hot water, adding thereto about the calculated quantity of sulphuric acid required for the decomposition, filtering the barium sulphate precipitated and concentrating the filtrate in a vacuo. From the sufficiently concentrated filtrate the free 2-hydroxycarbazole-7-sulphonic acid crystallizes.

It is a colorless substance, easily soluble in water and in alcohol, its monoalkali metal salts and its alkali earth metal salts are difficultly soluble in water, the dialkali metal salts are easily soluble in water. The new product is a valuable intermediate product in the manufacture of dyestuffs.

We wish it to be understood that the free 2-hydroxycarbazole-7-sulphonic acid as well as its salts fall within the scope of our invention.

The invention is illustrated by the following examples, without being limited thereto:

Example 1.—371 parts by weight of the sodium salt of carbazole-2.7-disulphonic acid (see British specification 358,056) are slowly introduced whilst stirring into a mixture of 900 parts by weight of potassium hydroxide and 400 parts by weight of sodium hydroxide, while heating the mixture to 265–275° C. The temperature is maintained for 3 hours, whereupon a mixture of 3500 parts by weight of water and 1600 parts of hydrochloric acid of 19° Bé is added. On cooling the dipotassium salt of 2-hydroxycarbazole-7-sulphonic acid crystallizes out. It is easily soluble in water with a blue fluorescence. By the addition of a mineral acid the monopotassium salt is formed which is soluble in water only with difficulty. By the addition of an aqueous barium chloride solution to the aqueous solution of the potassium salt, the barium salt precipitates. It is filtered, dissolved in hot water; the free acid is deliberated by the addition of diluted sulphuric acid. The barium sulphate formed is filtered off and the filtrate is concentrated in a vacuo until on cooling the 2-hydroxycarbazole-7-sulphonic acid crystallizes.

Example 2.—371 parts by weight of the sodium salt of carbazole-2.7disulphonic acid are heated with 1200 parts by weight of potassium hydroxide and 300 parts by weight of water in an autoclave under pressure for 10 hours to 270–290° C. The melt is worked up as described in Example 1.

We claim:

1. 2-hydroxycarbazole-7-sulphonic acid of the formula:

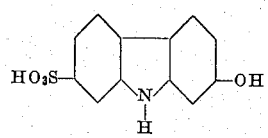

being a colorless substance, easily soluble in water and alcohol and being a valuble intermediate product in the manufacture of dyestuffs.

In testimony whereof, we affix or signatures.

WILHELM NEELMEIER.
OTTO GOLL.